(12) United States Patent
Sousley et al.

(10) Patent No.: US 10,801,380 B1
(45) Date of Patent: Oct. 13, 2020

(54) DURABLE HIGH PERFORMANCE WATER-COOLED EXHAUST SYSTEMS AND COMPONENTS AND METHODS OF MANUFACTURE

(71) Applicants: Steve Sousley, Concord, NC (US); Grant S. Cameron, Davidson, NC (US)

(72) Inventors: Steve Sousley, Concord, NC (US); Grant S. Cameron, Davidson, NC (US)

(*) Notice: Subject to any disclaimer, the term of this patent is extended or adjusted under 35 U.S.C. 154(b) by 138 days.

(21) Appl. No.: 16/205,176

(22) Filed: Nov. 29, 2018

Related U.S. Application Data

(60) Provisional application No. 62/593,681, filed on Dec. 1, 2017, provisional application No. 62/591,922, filed on Nov. 29, 2017.

(51) Int. Cl.
| | | |
|---|---|---|
| *F01N 3/04* | (2006.01) | |
| *F01N 13/08* | (2010.01) | |
| *B33Y 10/00* | (2015.01) | |
| *B33Y 50/00* | (2015.01) | |
| *G05B 19/40* | (2006.01) | |

(Continued)

(52) U.S. Cl.
CPC .............. *F01N 3/043* (2013.01); *B33Y 10/00* (2014.12); *B33Y 50/00* (2014.12); *B33Y 80/00* (2014.12); *F01N 13/08* (2013.01); *F01N 13/18* (2013.01); *G05B 19/4099* (2013.01); *F01N 2260/024* (2013.01); *G05B 2219/35134* (2013.01); *G05B 2219/49007* (2013.01)

(58) Field of Classification Search
CPC ...... F01P 3/02; F01P 3/12; F01P 11/16; F01P 2003/024; F01F 1/243; F01F 1/40; F01F 1/14; F01N 13/08; F01N 13/18; B33Y 10/00; B33Y 50/00; B33Y 50/02; B33Y 30/00; B33Y 70/00; B33Y 80/00; G05B 19/4099; G05B 2219/49007; G05B 2219/35134; F16L 9/18; F16L 9/19
USPC .................. 60/320, 321, 323; 138/114, 148; 29/890.032, 890.08
See application file for complete search history.

(56) References Cited

U.S. PATENT DOCUMENTS 3,206,836 A * 9/1965 Schlussler ............... B21C 37/29
29/890.08
4,179,884 A 12/1979 Koeslin
(Continued)

*Primary Examiner* — Thai Ba Trieu
*Assistant Examiner* — Dapinder Singh
(74) *Attorney, Agent, or Firm* — Tillman, Wright & Wolgin; James D. Wright; David R. Higgins

(57) ABSTRACT

An exhaust component for an engine exhaust system includes a conduit for carrying exhaust gases, an outer wall, a fluid inlet, a fluid outlet, and a pattern of internal support structures. The conduit, outer wall, and internal support structures are formed from an additive material using an additive manufacturing process. A water cavity is defined between the conduit and the outer wall. The fluid inlet and outlet are in fluid communication with the water cavity. The pattern of internal support structures are integral with the conduit and with the outer wall, are disposed in the water cavity, and are arranged such that fluid flows from the fluid inlet through, between, or around the internal support structures to the fluid outlet. The fluid and its flow through the water cavity is adapted to absorb heat from hot exhaust gases flowing through the conduit during operation of the engine exhaust system.

20 Claims, 18 Drawing Sheets

(51) Int. Cl.
    *F01N 13/18*     (2010.01)
    *G05B 19/4099*     (2006.01)
    *B33Y 80/00*     (2015.01)

(56) References Cited

U.S. PATENT DOCUMENTS

| | | |
|---|---|---|
| 5,148,675 A | 9/1992 | Inman |
| 5,740,670 A | 4/1998 | Woods |
| 6,035,633 A | 3/2000 | Woods |
| 6,397,589 B1 * | 6/2002 | Beson ............... F01N 3/046 60/320 |
| 6,564,901 B2 | 5/2003 | Woods |
| 7,581,620 B2 | 9/2009 | Woods |
| 9,435,211 B2 | 9/2016 | Xu |
| 9,758,228 B1 | 9/2017 | Langenfeld |
| 9,808,865 B2 | 11/2017 | Rogers |
| 2004/0177609 A1 * | 9/2004 | Moore, III ........... C04B 35/803 60/323 |
| 2010/0224144 A1 * | 9/2010 | Lopez-Crevillen ....... F02F 1/40 123/41.82 R |
| 2010/0242869 A1 * | 9/2010 | Knollmayr ............... F01P 3/02 123/41.82 R |
| 2012/0227686 A1 * | 9/2012 | D'Anna ................. F02F 1/243 123/41.82 R |
| 2012/0312257 A1 * | 12/2012 | Beyer ................... F02F 1/243 123/41.82 R |
| 2013/0055971 A1 * | 3/2013 | Brewer ................. F02F 1/243 123/41.82 R |
| 2017/0248064 A1 * | 8/2017 | Kudo ...................... F02F 1/40 |
| 2017/0284675 A1 | 10/2017 | North et al. |
| 2017/0284676 A1 | 10/2017 | North et al. |

* cited by examiner

DURABLE HIGH PERFORMANCE WATER-COOLED EXHAUST SYSTEMS AND COMPONENTS AND METHODS OF MANUFACTURE

CROSS-REFERENCE TO RELATED APPLICATIONS

The present application is a non-provisional patent application of, and claims the benefit under 35 U.S.C § 119(e) to U.S. Provisional Patent Application No. 62/591,922, filed Nov. 29, 2017, entitled "DURABLE HIGH PERFORMANCE WATER-COOLED EXHAUST SYSTEMS AND COMPONENTS WITH NARROW WATER JACKET CHANNELS AND METHODS OF MANUFACTURE," and U.S.

Provisional Patent Application No. 62/593,681, filed Dec. 1, 2017, entitled "DURABLE HIGH PERFORMANCE WATER-COOLED EXHAUST SYSTEMS AND COMPONENTS AND METHODS OF MANUFACTURE." The entirety of each of the foregoing are expressly incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to water-cooled exhaust systems and components, and, more particularly, to durable high performance one-piece water-cooled exhaust systems and components.

Background

Water-cooled exhaust systems and components for internal combustion engines are well known. However, while most automotive engines utilize a radiator, water cooling is not commonly used for exhaust systems in cars or small trucks. Marine vessels, by contrast, often utilize water-cooled exhaust systems either directly or indirectly because of the presence of water in the vessel's immediate environment. For example, in many cases, water-cooled exhaust systems draw raw water in and use it either to cool exhaust components directly or to cool water or other fluids in a closed loop via a heat exchanger. Exhaust systems using raw water may be "wet," wherein heated water is mixed with the exhaust gases (typically at the end of the tail pipe), or the systems may be "dry," wherein the heated water is discharged to the environment separately from the exhaust gases. Furthermore, some marine vessels utilize water-cooling instead of air-cooling because of the difficulties in exhausting heated air from the small, closed, compartments in which the engines are often housed. This may be particularly common in high performance pleasure boats and the like.

Water-cooling for exhaust components involving tubes, conduits, or the like, such as headers, typically involves the use of a water jacket, which at least as used herein refers to a water- or other fluid-filled casing, including both a water cavity and an outer wall, surrounding the exhaust component carrying the hot exhaust gases. A water jacket may be integral with the conduit itself, or it may be produced separately and assembled together with the conduit using various processes. The former type is conventionally produced via castings, while the latter type is conventionally produced via weldments/fabrication. Cast exhaust components are highly durable, but are typically not suitable for high performance applications. Weldments/fabrications are more commonly used for high performance applications, but are considerably less durable than castings. The welds themselves, such as between the water jacket and the exhaust tubes or around bosses or bungs for sensors and the like, are a particular problem both with respect to manufacture and reliability.

Thus, a need exists for durable, high performance water-cooled exhaust components and systems, particularly including exhaust headers, and particularly for use in marine applications.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes a method of manufacturing a water-cooled exhaust component for an engine exhaust system, including: designing a conduit for carrying hot exhaust gases in an engine exhaust system; designing a water jacket for the conduit, the water jacket including an outer wall to surround the conduit and a water cavity between outer surfaces of the conduit and inner surfaces of the outer wall; designing a pattern of internal structures between the conduit and the outer wall, the pattern of internal structures providing integral support between the conduit and the outer wall while permitting fluid flow through the water cavity; providing a computer file representing an integrated design for the conduit, water jacket, and internal structures to an additive manufacturing system; and thereafter, repetitively applying additive layers of material to produce a water-cooled exhaust component, wherein the water-cooled exhaust component includes the conduit, the water jacket, and the internal structures, and wherein the conduit, the water jacket, and the internal structures in the completed component are integral with one another.

In a feature of this aspect, the pattern of internal structures includes a plurality of ribs or stringers defining a plurality of channels within the water jacket. In further features, designing the pattern of internal structures includes designing the ribs or stringers, and the channels defined thereby, to promote the distribution of the fluid in the water jacket; designing the pattern of internal structures includes designing the ribs or stringers, and the channels defined thereby, to minimize localized hot or cool spots in the water jacket; designing the pattern of internal structures includes designing the ribs or stringers such that the channels defined thereby include longitudinal channels that extend along the conduit; designing the pattern of internal structures includes designing the ribs or stringers such that the longitudinal channels defined thereby extend substantially along the entire length of the conduit; designing the pattern of internal structures includes designing the ribs or stringers such that the channels defined thereby further include perforations or cross-channels between the longitudinal channels; designing the pattern of internal structures includes designing the ribs or stringers such that the channels defined thereby are parallel to one another; and/or designing the pattern of internal structures includes designing the ribs or stringers such that the channels defined thereby are parallel to the conduit.

In another feature of this aspect, the conduit is a pipe forming part of an exhaust header. In a further feature: the pipe is a first pipe with a first water jacket; the method further includes designing a second pipe, having a second water jacket and a second pattern of internal structures, for carrying hot exhaust gases in the engine exhaust system; the method further includes designing a collector, having a third water jacket, for receiving the hot exhaust gases from the first and second pipes, such that the third water jacket is in fluid communication with the first and second water jackets; and the step of repetitively applying additive layers of material includes repetitively applying additive layers of material to produce the header, including the first and second pipes, the collector, the first, second, and third water jackets, and the internal structures. In a still further feature, the step of designing a collector includes designing a true merge collector wherein a smooth flow of exhaust gases is provided from a distal end of each respective pipe at a substantially uniform pipe diameter and pipe angle for each pipe.

Broadly defined, the present invention according to another aspect includes a method of cooling an exhaust component in an engine exhaust system, including: manufacturing, via an additive manufacturing process, an exhaust component having a conduit for carrying hot exhaust gases in an engine exhaust system, an outer wall surrounding the conduit, a water cavity between outer surfaces of the conduit and inner surfaces of the outer wall, a fluid inlet, a fluid outlet, and a pattern of internal structures between the conduit and the outer wall, wherein the pattern of internal structures provides integral support between the conduit and the outer wall while permitting fluid flow through the water cavity; installing the exhaust component in operative relationship in an engine exhaust system; supplying fluid to the fluid inlet of the exhaust component such that it flows into the water cavity; and during operation of the engine exhaust system, conducting the fluid from the fluid inlet through the pattern of internal structures in the water cavity to the fluid outlet such that as the fluid flows through the water cavity, the fluid absorbs heat from hot exhaust gases flowing through the conduit.

In a feature of this aspect, the pattern of internal structures includes a plurality of ribs or stringers defining a plurality of channels within the water cavity; the channels defined by the ribs or stringers include longitudinal channels that extend along the conduit; the longitudinal channels defined by the ribs or stringers extend substantially along the entire length of the conduit; the channels defined by the ribs or stringers further include perforations or cross-channels between the longitudinal channels; the channels defined by the ribs or stringers are parallel to one another; and/or the channels defined by the ribs or stringers are parallel to the conduit.

In another feature of this aspect, the conduit is a pipe forming part of an exhaust header. In a further feature: the pipe is a first pipe; the manufacturing process includes manufacturing, via the additive manufacturing process and in conjunction with manufacturing the first pipe, a second pipe having a second conduit, a second outer wall surrounding the second conduit, a second water cavity between the second conduit and the second outer wall, and a second pattern of internal structures providing integral support between the second conduit and the second outer wall while permitting fluid flow through the second water cavity; and the manufacturing process includes manufacturing, via the additive manufacturing process and in conjunction with manufacturing the first pipe and the second pipe, a collector having a third water jacket, for receiving hot exhaust gases from the first and second pipes, such that the third water jacket is in fluid communication with the first and second water jackets.

In a still further feature, the method also includes a step of providing a smooth flow of the exhaust gases from the first and second pipes via substantially uniform pipe diameters and pipe angles for distal ends of each of the first and second pipes.

Broadly defined, the present invention according to another aspect includes an exhaust component for an engine exhaust system, including: a conduit, formed from an additive material, for carrying exhaust gases in an engine exhaust system; an outer wall, formed from the additive material and integral with the conduit, surrounding the conduit such that a water cavity is defined between outer surfaces of the conduit and inner surfaces of the outer wall; a fluid inlet in fluid communication with the water cavity; a fluid outlet in fluid communication with the water cavity; and a pattern of internal support structures, formed from the additive material and integral with the conduit and with the outer wall, disposed in the water cavity and arranged such that fluid flows from the fluid inlet through, between, or around the internal support structures to the fluid outlet; wherein the fluid and its flow through the water cavity is adapted to absorb heat from hot exhaust gases flowing through the conduit during operation of the engine exhaust system.

In a feature of this aspect, the pattern of internal structures includes a plurality of ribs or stringers defining a plurality of channels within the water cavity; the channels defined by the ribs or stringers include longitudinal channels that extend along the conduit; the longitudinal channels defined by the ribs or stringers extend substantially along the entire length of the conduit; the channels defined by the ribs or stringers further include perforations or cross-channels between the longitudinal channels; the channels defined by the ribs or stringers are parallel to one another; and/or the channels defined by the ribs or stringers are parallel to the conduit.

In a further feature of this aspect, the conduit is a pipe forming part of an exhaust header. In a further feature: the pipe is a first pipe; the exhaust component further comprises a second pipe, formed from the additive material and integral with the first pipe, that includes a second conduit, a second outer wall surrounding the second conduit, a second water cavity between the second conduit and the second outer wall, and a second pattern of internal structures providing integral support between the second conduit and the second outer wall while permitting fluid flow through the second water cavity; and the exhaust component further comprises a collector, formed from the additive material and integral with the first pipe and with the second pipe, for receiving hot exhaust gases from the first and second pipes, wherein the collector includes a third water jacket that is in fluid communication with the first and second water jackets. In a still further feature, the first and second pipe each have a distal end, having a pipe diameter, that joins with the collector at an angle relative to the collector, wherein the pipe diameter of the distal end of the first pipe is the same as the pipe diameter of the distal end of the second pipe, and wherein the angle at which the first pipe joins the collector is the same as the angle at which the second pipe joins the collector.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
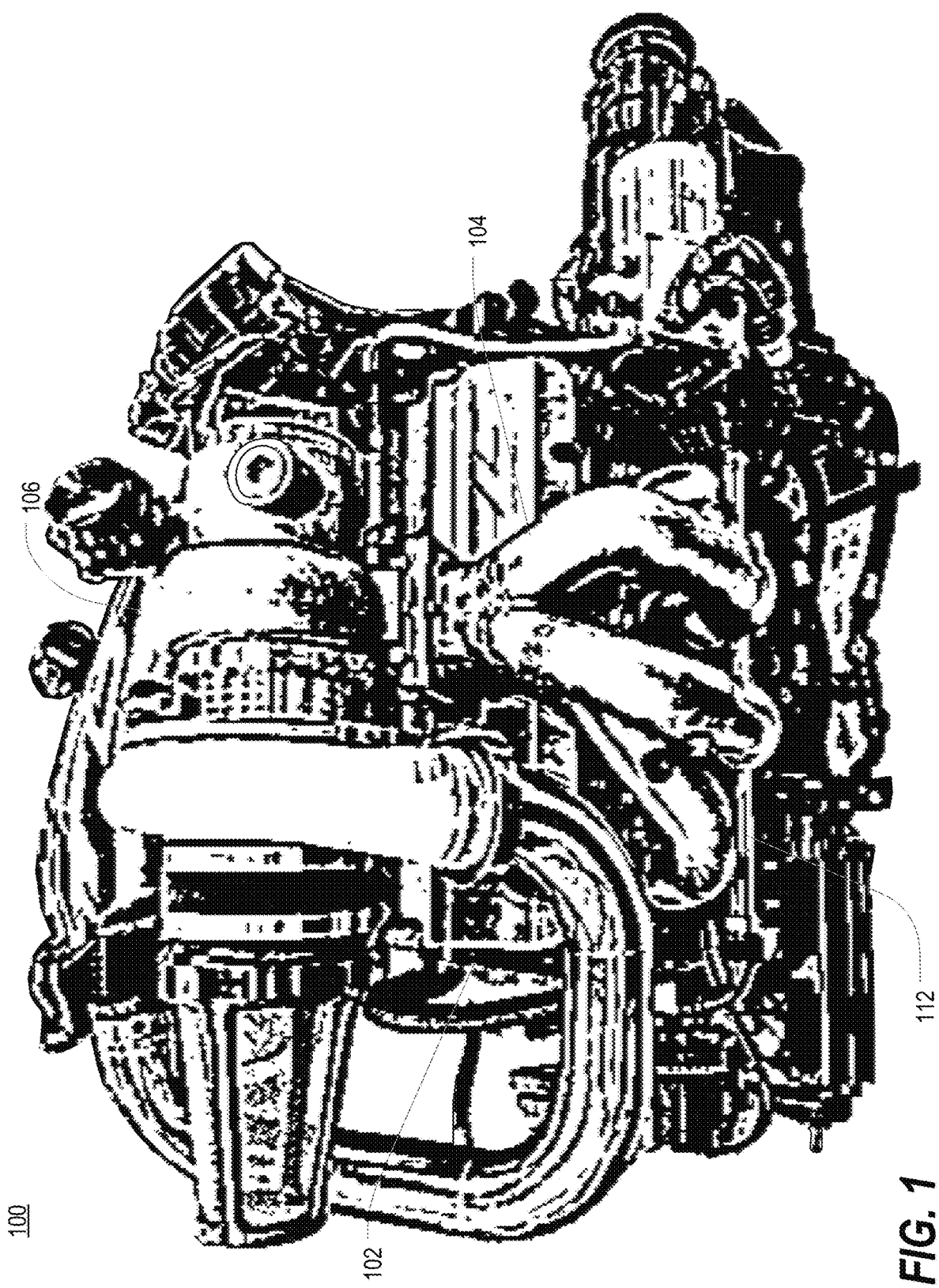
FIG. 1 is a perspective view of an exemplary internal combustion engine utilizing water-cooled headers in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing herefrom, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

One or more preferred embodiments of the present invention pertain to a high performance marine exhaust header and method for using additive manufacturing to create the exhaust header. In this regard, FIG. 1 is a perspective view of an exemplary internal combustion engine assembly 100 utilizing water-cooled headers in accordance with one or more preferred embodiments of the present invention. As shown therein, the exemplary engine assembly 100 includes a V-8 engine 102, a pair of water-cooled header assemblies 104, and a pair of turbochargers 106. The header assemblies 104 receive exhaust gases, typically at an elevated temperature relative to the environment, from the engine 102 and direct such gases to the turbochargers 106. In the illustrated embodiment, both the headers and the turbochargers include water jackets, and the water jackets of the turbochargers are linked directly to the water jackets of the headers, but it will be understood that in various embodiments, water jacketing may be utilized individually or jointly on various exhaust components. Also, although turbochargers 106 are shown and the illustrated engine 102 is a V-8 engine, it will be apparent that they are shown merely for purposes of illustration, and the present invention may be used with a wide variety of engines and related components. Still further, it will be appreciated that applicability of the present invention is not limited to marine engines and exhaust components, as both terrestrial- and aerospace-related engines and related components may likewise make use of the teachings herein.

Figure 2:
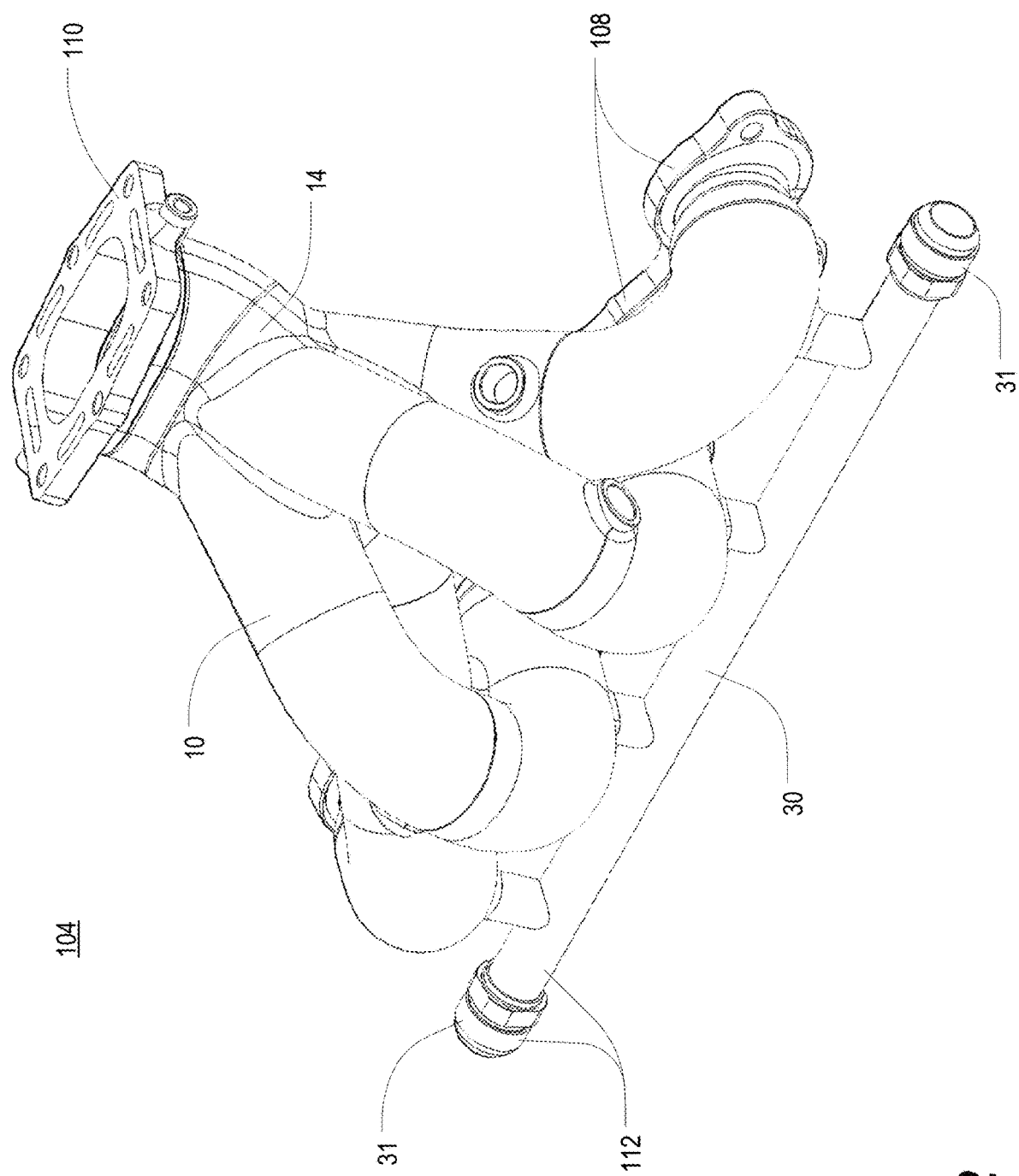
FIG. 2 is an isometric view of one of the water-cooled header assembly shown in FIG. 1.

FIG. 2 is an isometric view of the water-cooled header assembly 104 shown in FIG. 1. The header assembly 104 includes a four-tube header 10 terminating in a collector 14, a header mounting flange 108, a collector mounting flange 110 at the distal end of the collector 14, and a water tube assembly 112. The header 10 includes a water jacket with distinct portions around each tube as well as around the collector 14. The header assembly 104 is mounted to the engine 102 via the header mounting flange 108 and to a turbocharger 106 via the collector mounting flange 110. In at least some embodiments, the collector mounting flange 110 has bosses for supporting the whole header assembly 104. This takes stress off the weldment in the area between the flange 110 and the header 10, thereby increasing reliability and durability. Water or other fluid is provided to the water jacket via the water tube assembly 112, which in the illustrated embodiment includes a straight pipe 30 with a fitting 31 for a hose or the like at each end (partially visible in FIG. 1).

Figure 3:
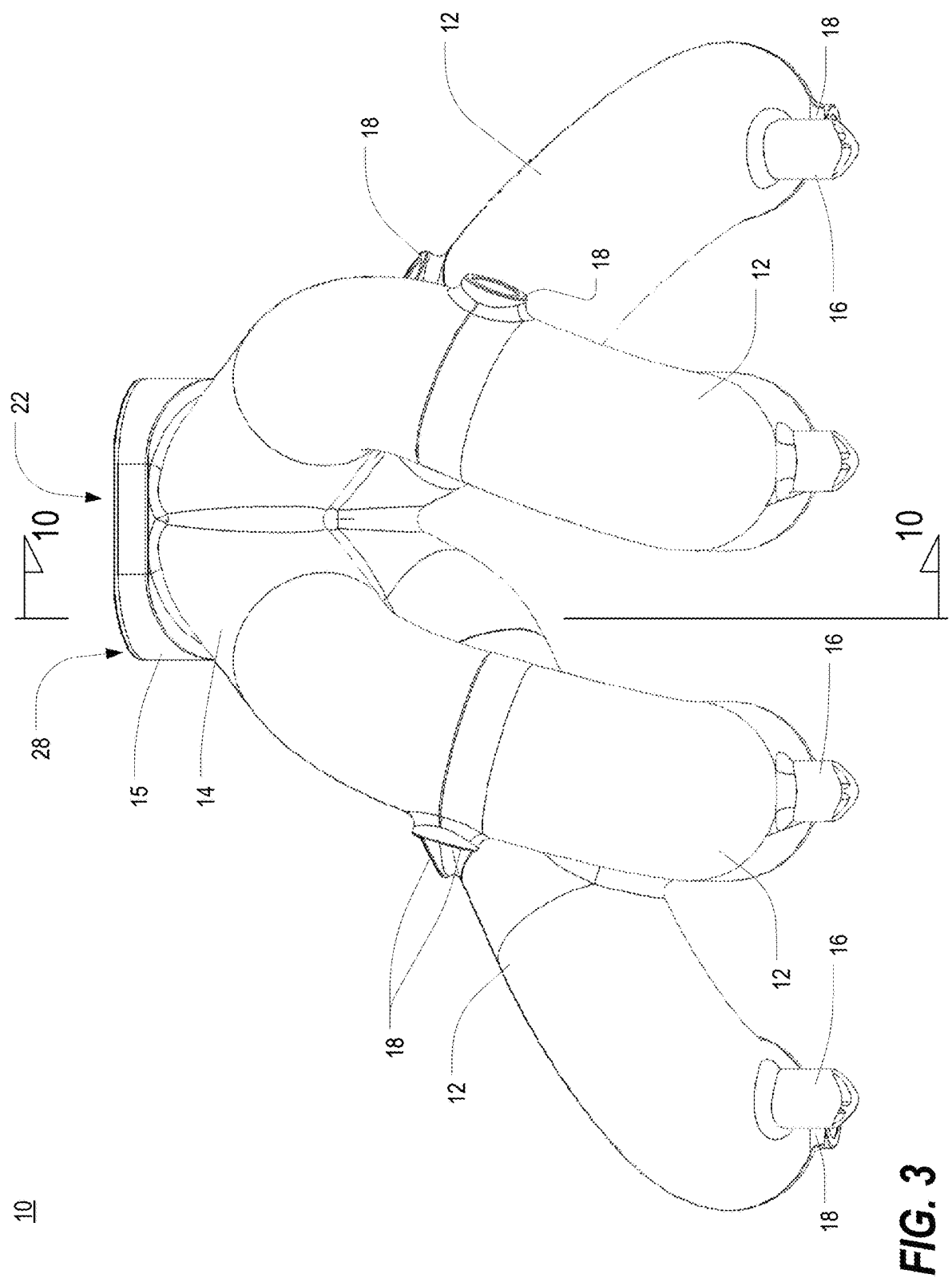
FIG. 3 is a front view of the exemplary water-cooled exhaust header of FIG. 2.
Figure 4:
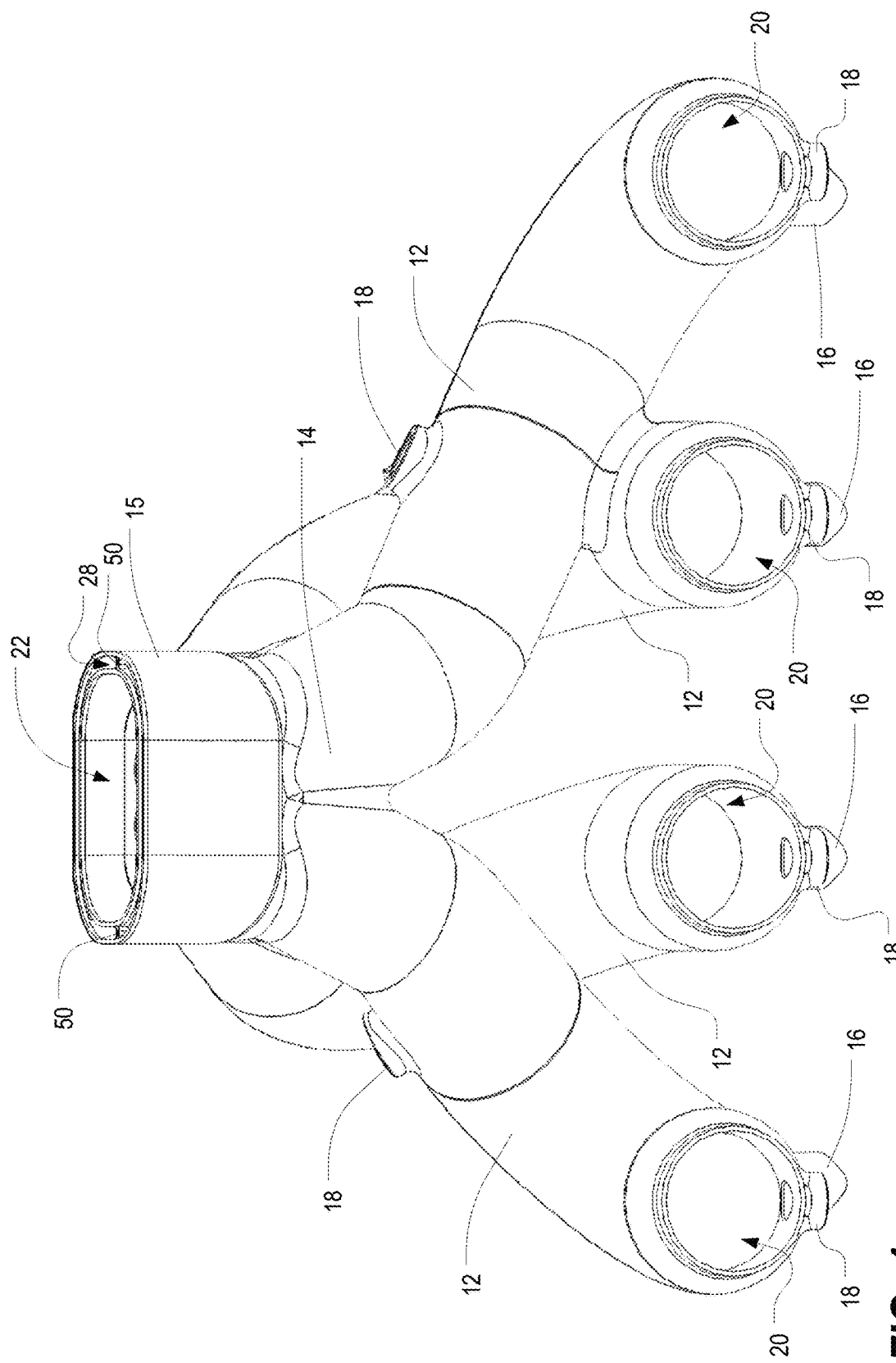
FIG. 4 is a rear view of the exemplary water-cooled exhaust header of FIG. 2.
Figure 5:
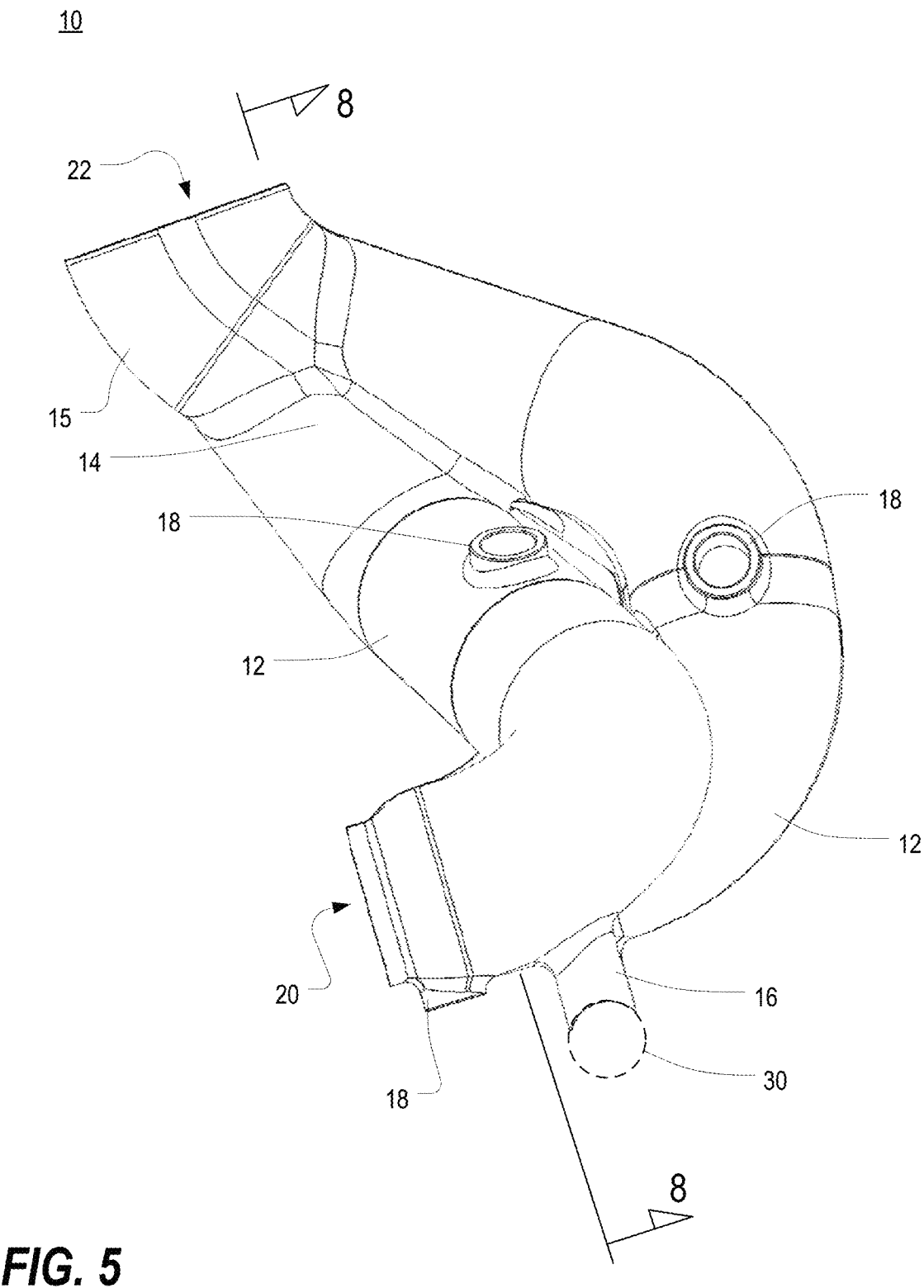
FIG. 5 is a left side view of the exemplary water-cooled exhaust header of FIG. 2.
Figure 6:
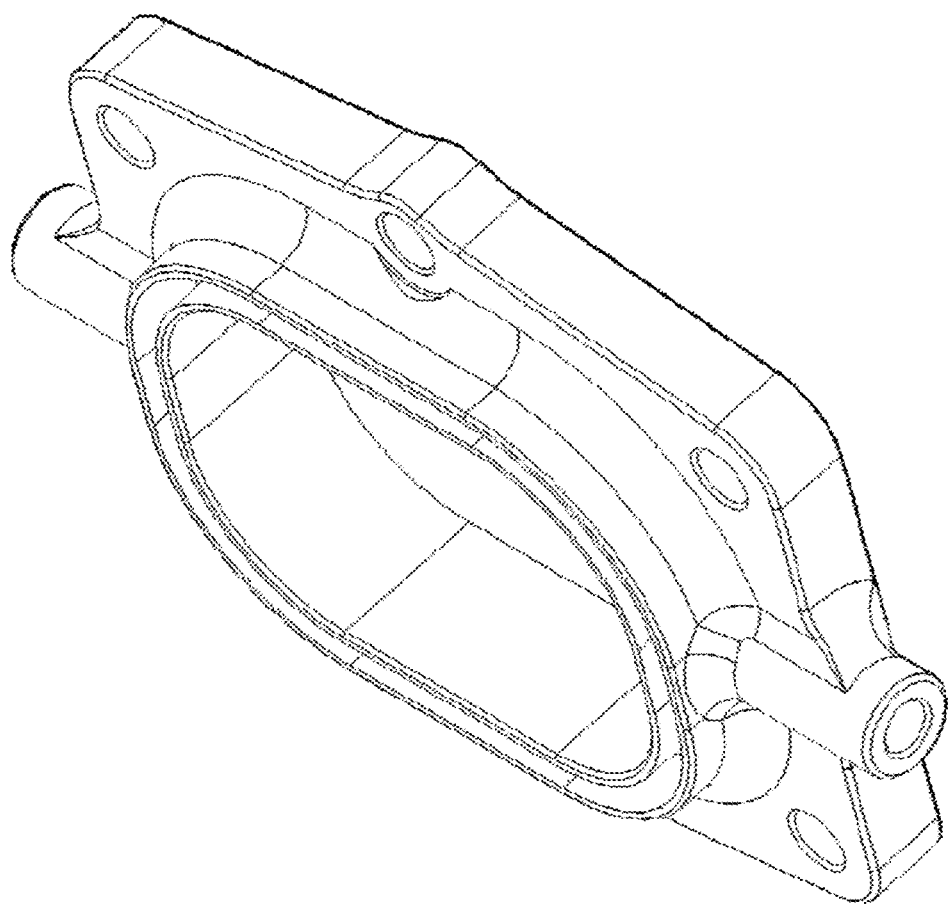
FIG. 6 is an isometric view of the turbocharger flange of FIG. 2.

FIGS. 3-5 are a front view, a rear view, and a left side view, respectively, of the exemplary water-cooled exhaust header 10 of FIG. 2. The header 10 includes four pipes 12, a collector 14, a collector outlet body 15, a plurality of water inlets 16, and a plurality of sensor bosses or bungs 18 for exhaust gas temperature and oxygen sensors and the like. As perhaps best shown in FIG. 3, the portion of the water jacket around the collector outlet body 15 is left open to the end so as to permit water to flow from the water jacket of the header 10 to the water jacket of the turbocharger 106 via the collector mounting flange 110. In this regard, FIG. 6 is an isometric view of the collector mounting flange 110 of FIG. 2 showing the flow-through provided thereby.

As with other high performance exhaust headers (both water-cooled and air-cooled), the pipes 12 are designed so as to have substantially the same length as one another and to terminate in the collector 14 at relatively narrow angles relative to one another. As is common with the design of such headers, the exact lengths of the pipes 12 are controlled by incorporating carefully-designed curved sections. The curves, lengths, and angles, as well as other features, are provided to provide optimal flow of exhaust gases in the pipes 12 from the entrance openings 20 to the collector outlet 22.

As further described and illustrated elsewhere herein, each pipe 12, as well as the collector 14, includes an internal tube or other conduit 24 surrounded by an outer wall 26 such that a water cavity 28 exists between the outer surfaces of the internal tube 24 and the inner surfaces of the outer wall 26. The water cavity 28 and outer wall 26 are sometimes collectively referred to as a "water jacket." Notably, although usually described herein in terms of water (raw or otherwise) being the fluid used, it will be appreciated that other fluids, such as without limitation an antifreeze mixture, may additionally or alternatively be utilized. However, the terms used herein, such as "water inlets," "water outlets," "water jacket," and the like, will generally make reference to water for the sake of convenience, and it will be understood that unless context dictates otherwise, the term "water" includes these other fluids.

The entire header 10 is preferably manufactured as a single structure. More particularly, each pipe 12 is manufactured such that the structure of the internal tube 24 is integral with the structure of the respective outer wall 28 surrounding it, the collector 14 is manufactured such that the structure of its inner wall 26 is integral with the structure of the outer wall 26 surrounding it, the structures of the respective inner tubes or walls 26 of the collector 14 and various pipes 12 are all integral with one another, and the structures of the respective outer walls 28 of the collector 14 and various pipes 12 are all integral with one another. This achieved not only via the integral structural connections at the proximal ends of the pipes 12 (adjacent the header mounting flange 108) and at the various bungs 18 but also, as is further described elsewhere herein, through the use of interconnecting internal structures in the water jacket. The resulting integral, single-body structure is less susceptible to damage, particularly at locations that conventionally would require welds, and therefore vastly more reliable.

Figure 7:
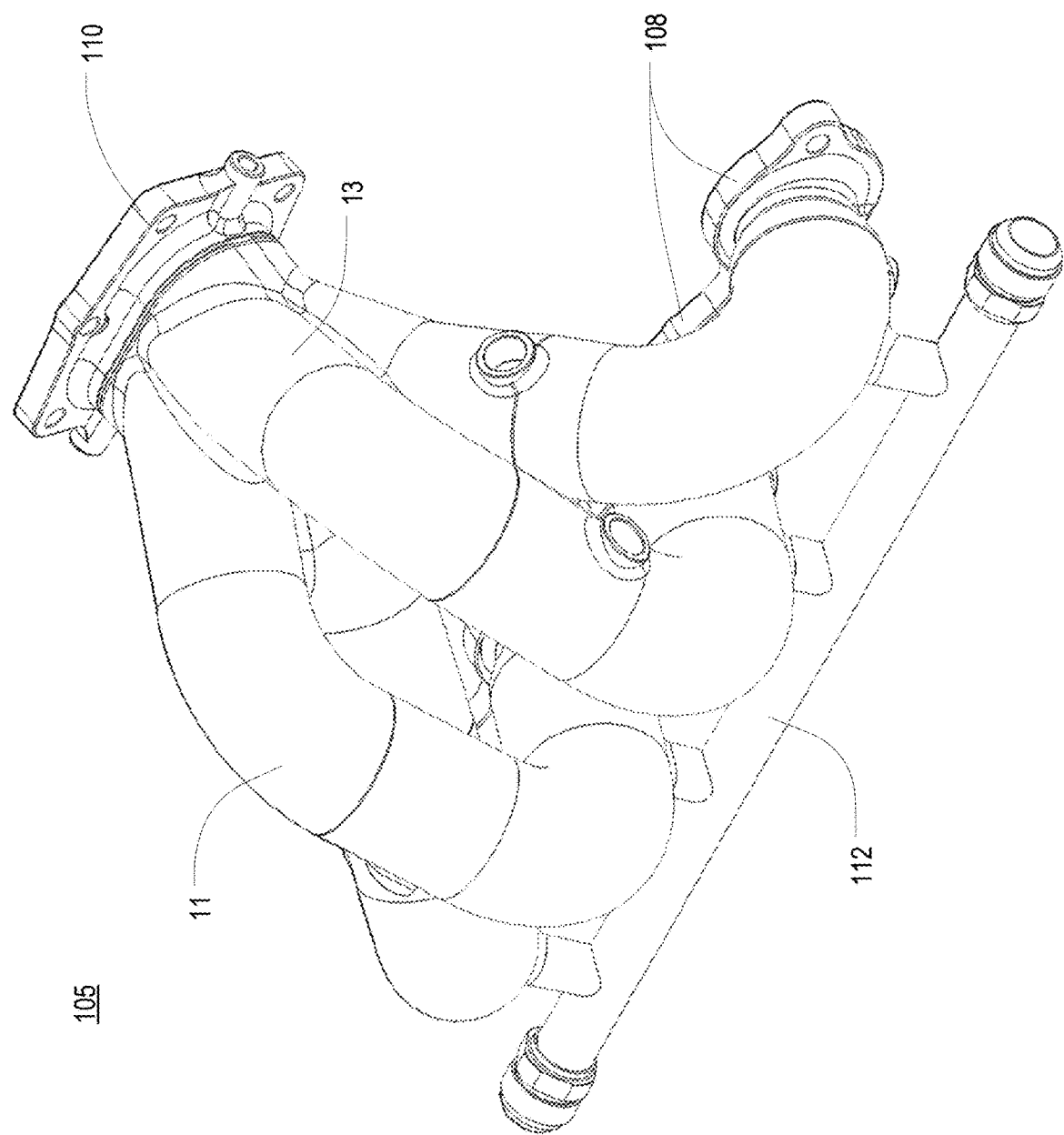
FIG. 7 is an isometric view of a water-cooled header assembly suitable for use on the opposite side of the V-8 engine of FIG. 1.

It will be understood that the header 10 of FIGS. 1-5 is only exemplary, and that an infinite variety of headers, as well as various other exhaust components, are possible without departing from the scope of the present invention. For example, FIG. 7 is an isometric view of a water-cooled header assembly 105 suitable for use on the opposite side of the V-8 engine 102 of FIG. 1. Like the first header assembly 104, the header assembly 105 of FIG. 7 includes a four-tube header 11 terminating in a collector 13, a header mounting flange 108, a collector mounting flange 110 at the distal end of the collector 13, and a water tube assembly 112. However, the curvature of the pipes of the header 11 is different than that of the first header assembly 104, and the collector 13 lacks the curvature of the collector 14 of the first header assembly 104. The particular header design and resultant header assembly is dependent on the needs of the particular situation, but it will be understood that the teachings of the present invention are applicable regardless.

Returning to the first header assembly 104, the water inlets 16 and outlet(s) are arranged in fluid communication with the water cavity 28. As shown in FIGS. 2-5, the water inlets 16 may be arranged in line with each other such that they may be connected to the water tube assembly 112, which in at least some embodiments includes a straight pipe 30 (shown in FIG. 2 and in phantom in FIG. 5) that supplies water to all four inlets 16. However, in various embodiments, water entry may be provided by bosses or fittings that may be located as shown or may be located elsewhere. Furthermore, water delivery may be provided by, for example, water hoses (not shown) rather than by the straight pipe 30. Also, although not included in this exemplary header 10, water outlets in the form of bosses, fittings, or the like may likewise be provided, typically near the collector and/or on the collector outlet body. If water outlet fittings are provided, water hoses, pipes, or the like (not shown) may be coupled to them to receive heated water from the water jacket of the header 10 and direct it to other components or dispose of it as desired.

In at least some embodiments, including the ones illustrated herein, the internal tube 24 of each pipe 12 is centered within the outer wall 26. Furthermore, at least in part to provide optimal flow of the exhaust gases, each internal tube 24, and each respective outer wall 26 as well, is circular in cross-section, so each internal tube 24 and its outer wall 26 are concentric with one another. However, it will be appreciated that the present invention also finds applicability with pipes 12 that are not circular in cross-section. Furthermore, it will be appreciated that in some embodiments, it may be useful to design and implement outer walls 26 (and thus water jackets) that are not centered around the internal tube 24. For example, in some designs it may be useful to provide greater water capacity on one side of a pipe 12 than on the opposite side.

Figure 8:
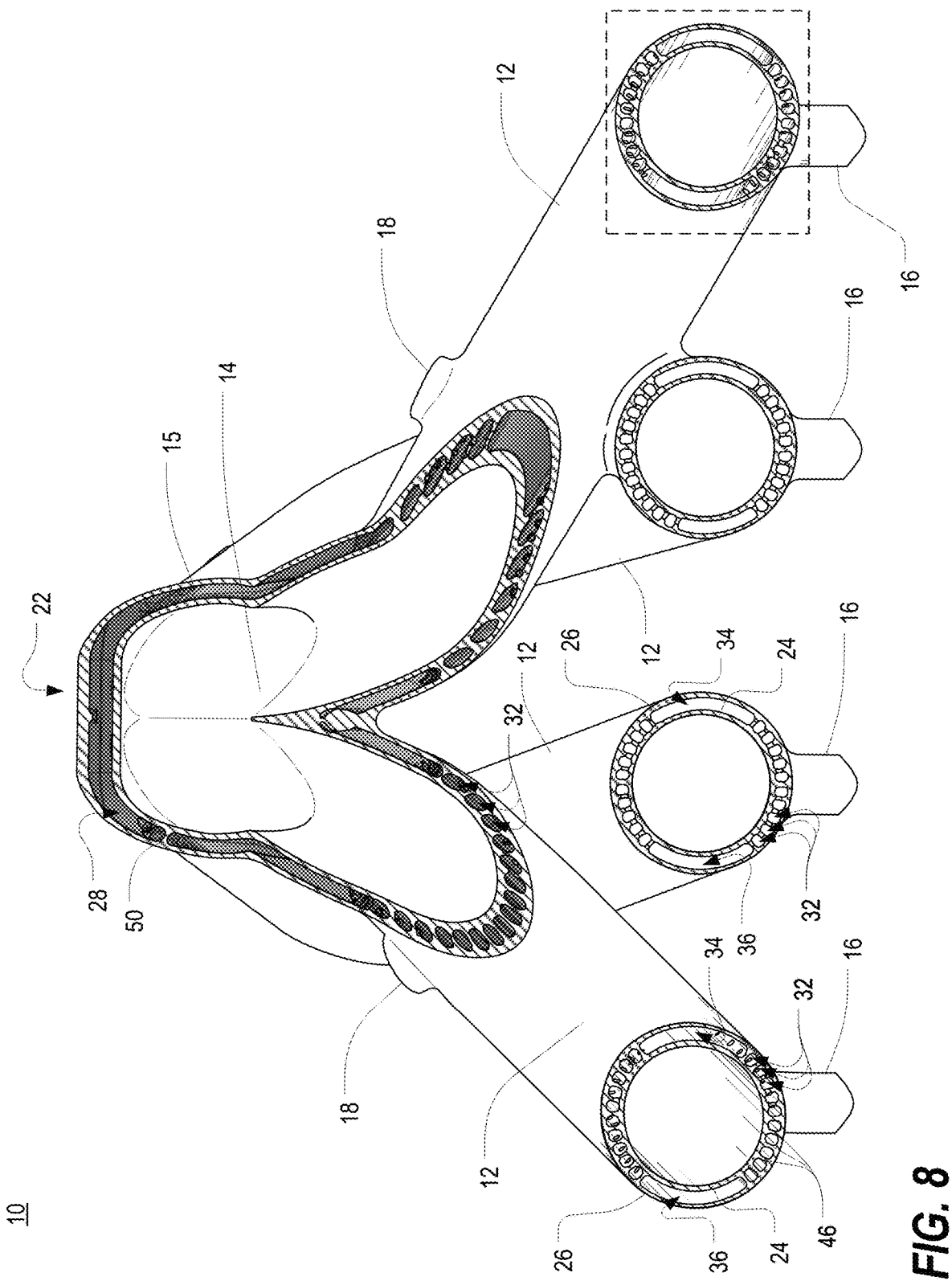
FIG. 8 is a rear cutaway view of the exemplary water-cooled exhaust header of FIG. 5, wherein the header has been cut along line 8-8.
Figure 9:
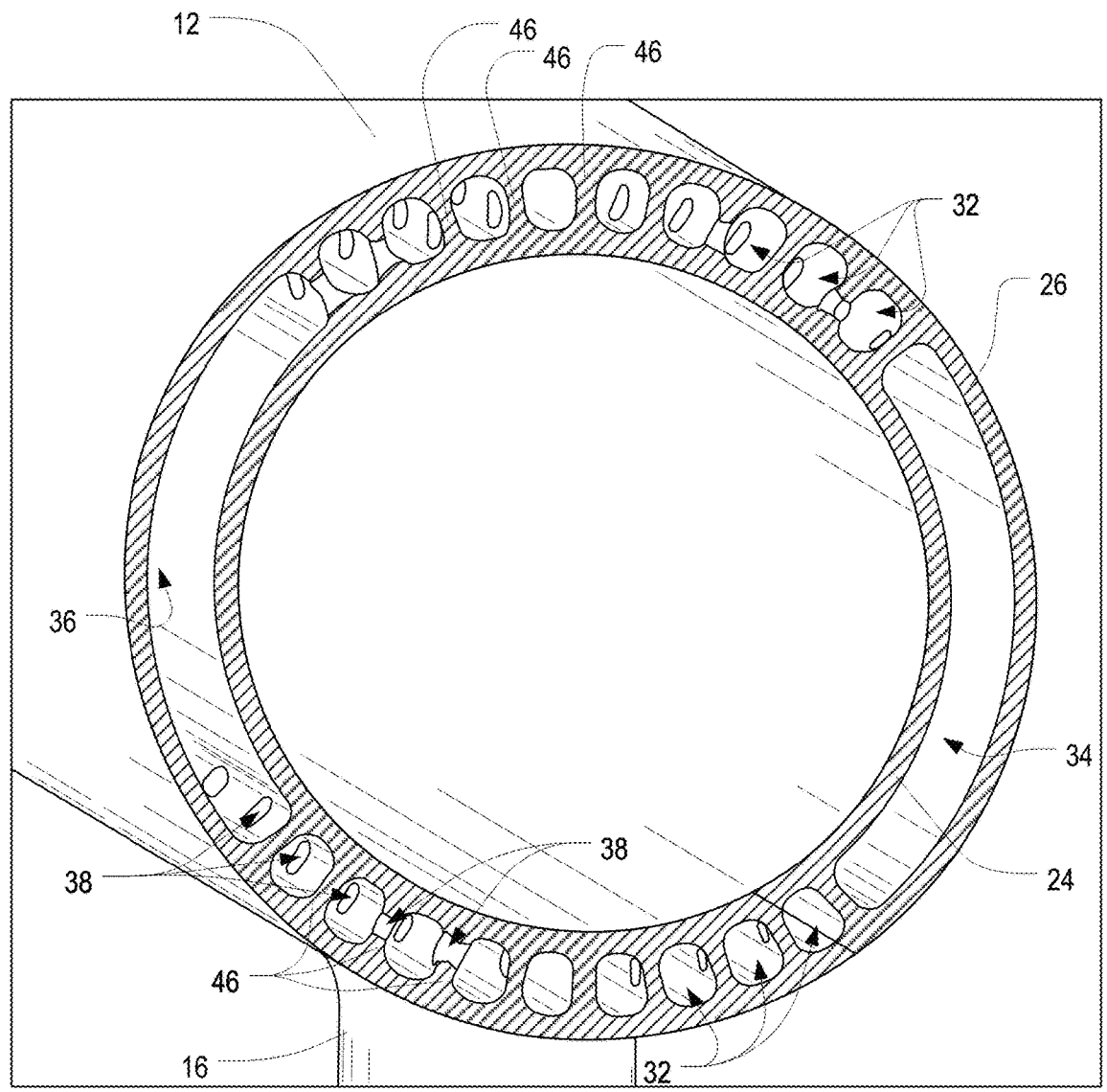
FIG. 9 is an enlarged fragmentary view of the lower right corner of FIG. 8.
Figure 10:
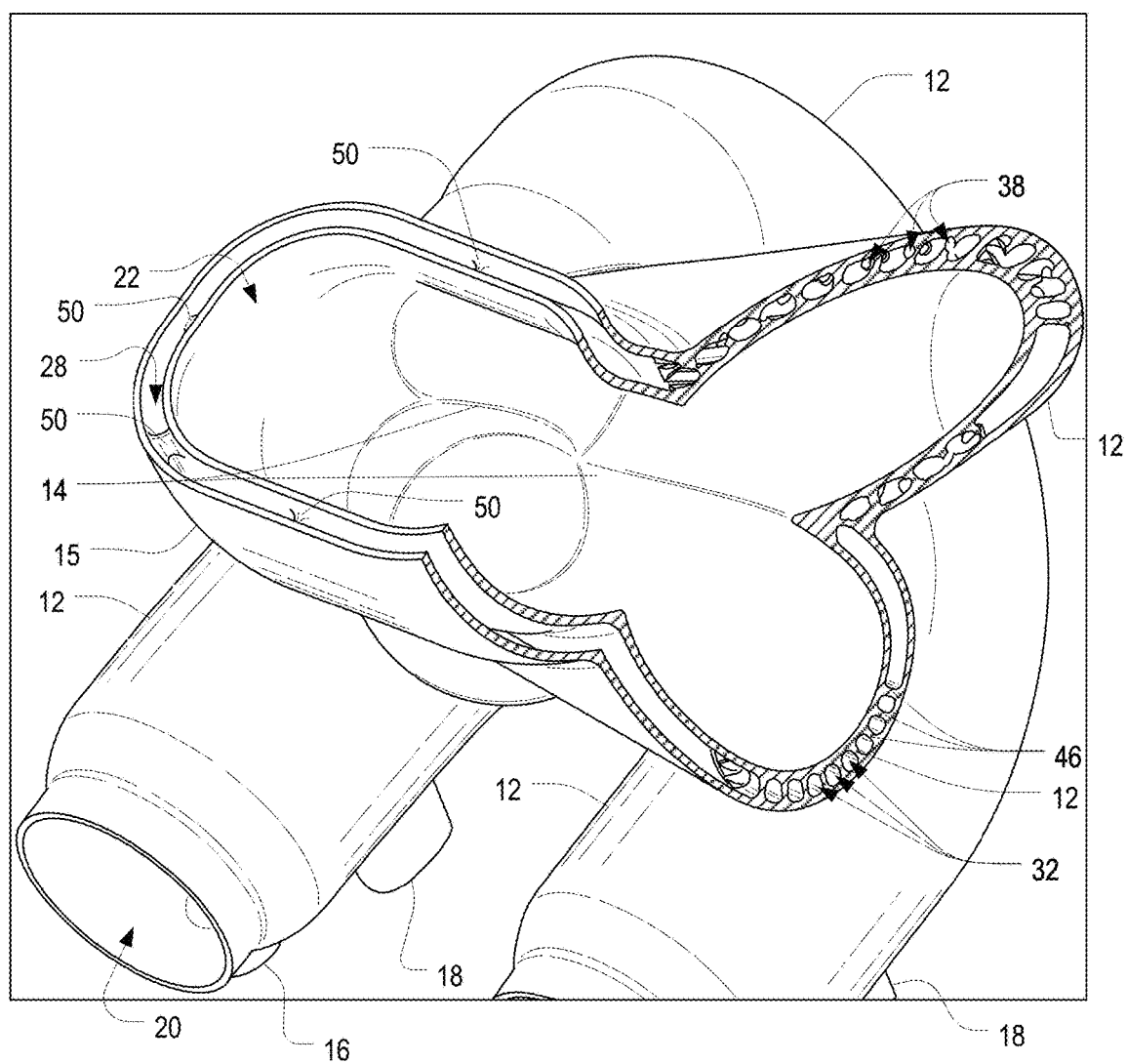
FIG. 10 is a side cutaway view of the exemplary water-cooled exhaust header of FIG. 3, wherein the header has been cut along line 10-10.

Although described hereinabove as a cavity, the space 28 between the outer surfaces of the internal tube 24 and the inner surfaces of the outer wall 26 is non-homogenous. In particular, a plurality of narrow channels 32 are defined between the internal tube 24 and the outer wall 26 of each pipe 12. In this regard, FIG. 8 is a rear cutaway view of the exemplary water-cooled exhaust header 10 of FIG. 5, wherein the header 10 has been cut along line 8-8; FIG. 9 is an enlarged fragmentary view of the lower right corner of FIG. 8; and FIG. 10 is a side cutaway view of the exemplary water-cooled exhaust header 10 of FIG. 3, wherein the header 10 has been cut along line 10-10. As illustrated therein, the walls 46 of the narrow channels 32 are defined by a series of ribs, stringers, or other structures that are arranged between the bottom of the internal tube 24 and the bottom of the outer wall 26 and also between the top of the internal tube 24 and the top of the outer wall 26. However, the space 34 between the left side of the internal tube 24 and the left side of the outer wall 26 and the space 36 between the right side of the internal tube 24 and the right side of the outer wall 26 are each uninterrupted.

Figure 11:
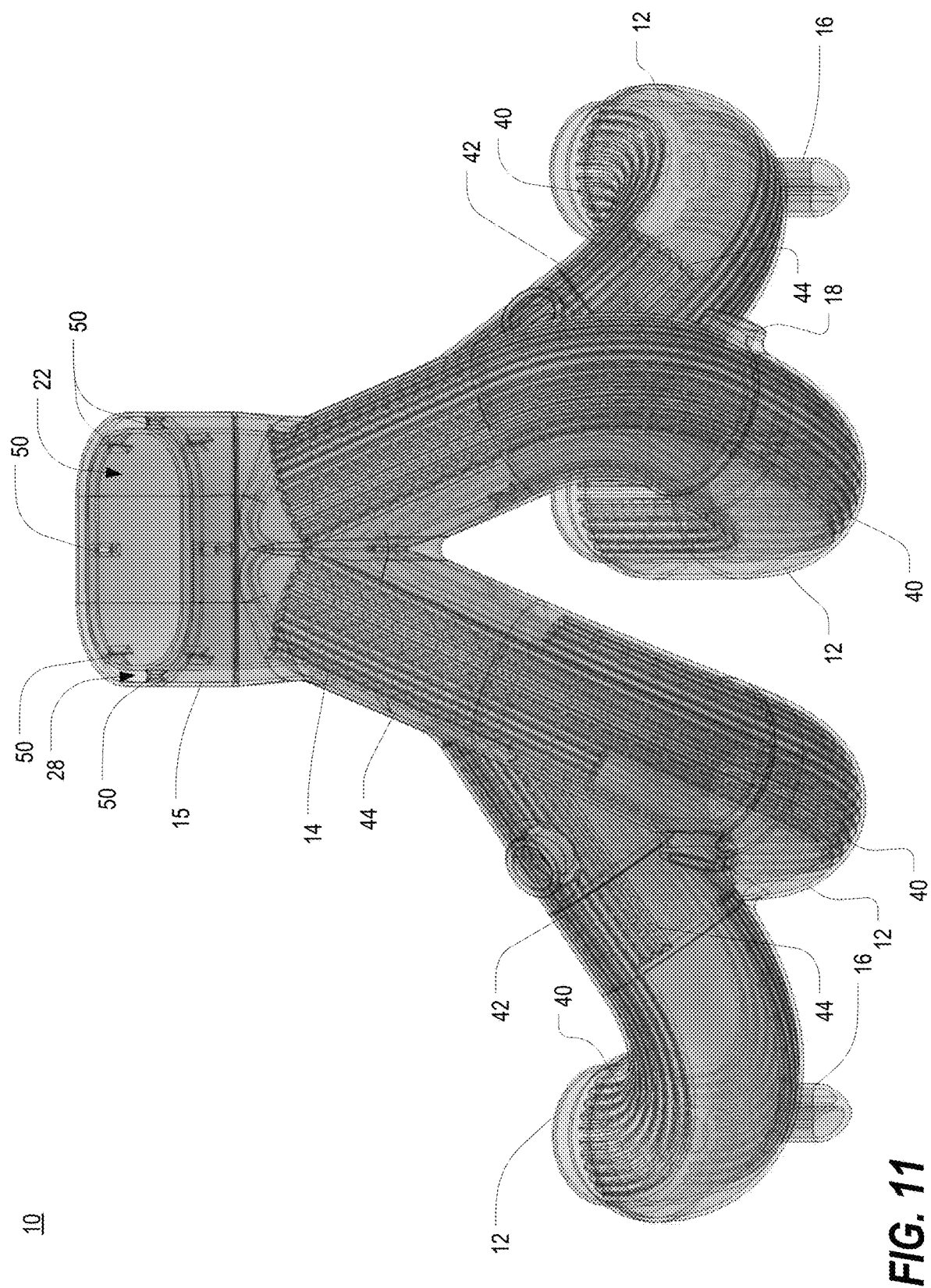
FIG. 11 is a transparent front view of the exemplary water-cooled exhaust header of FIG. 2.
Figure 12:
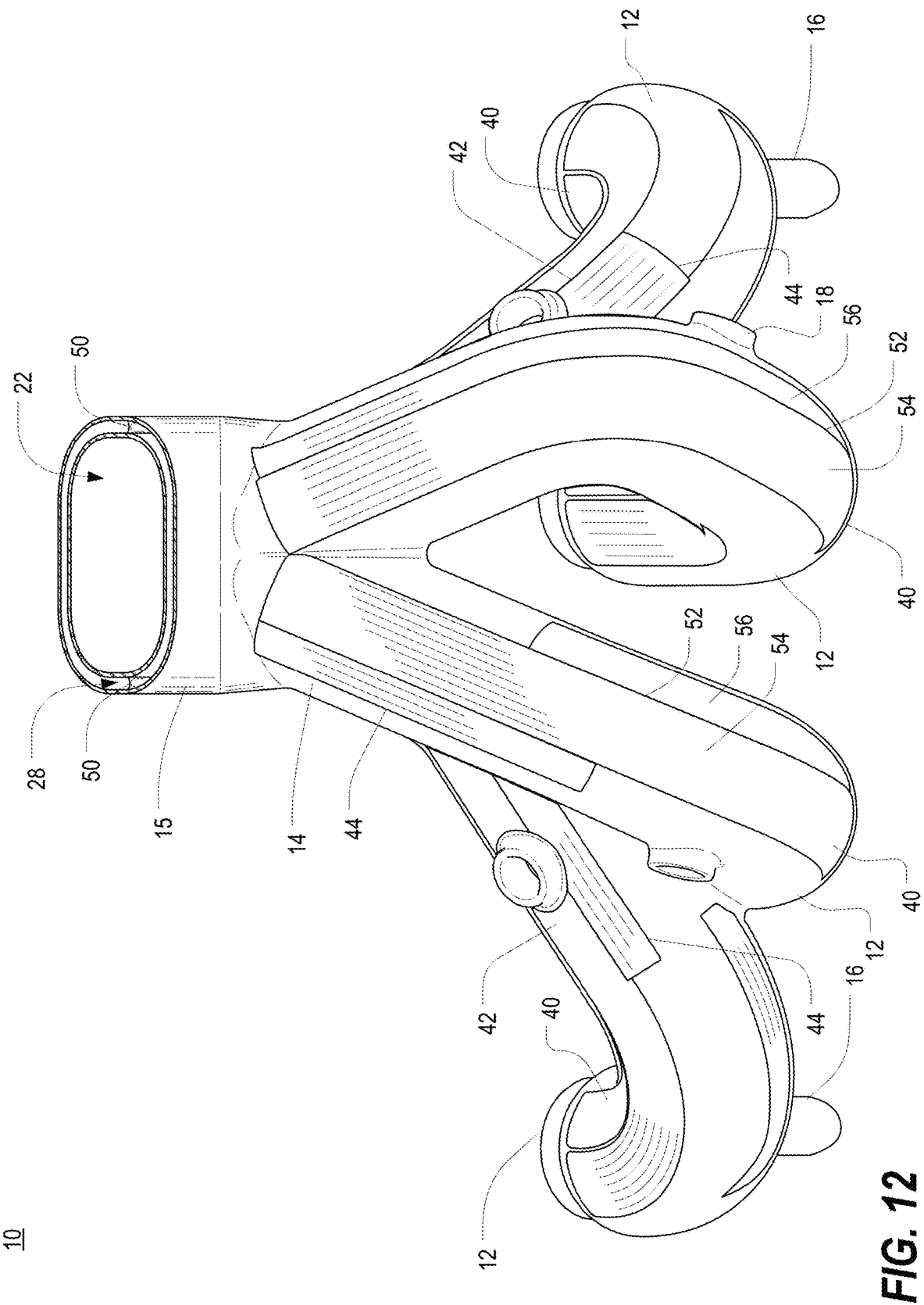
FIG. 12 is a partially schematic front view of the exemplary water-cooled exhaust header of FIG. 2.
Figure 13:
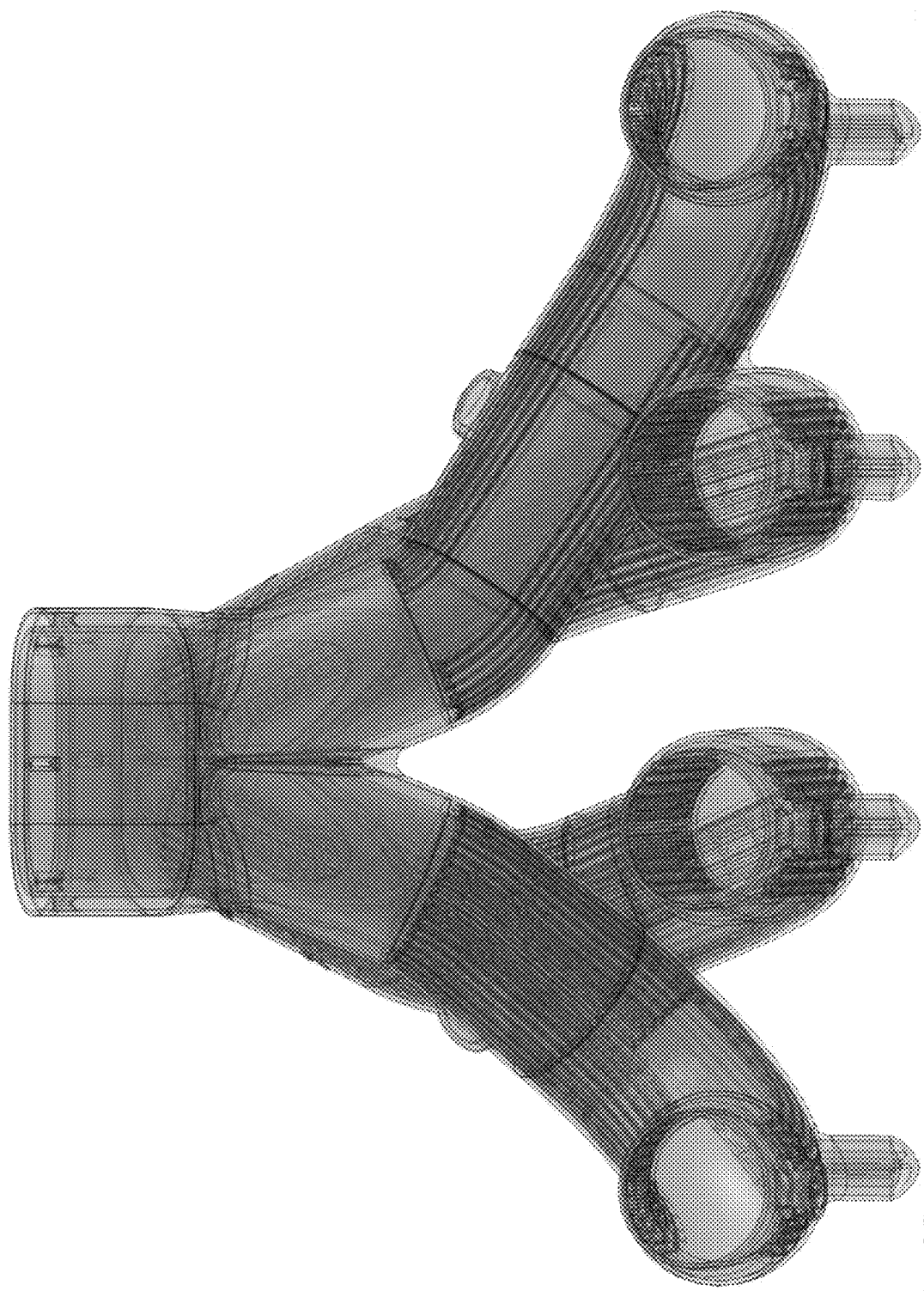
FIG. 13 is a transparent rear view of the exemplary water-cooled exhaust header of FIG. 2.
Figure 14:
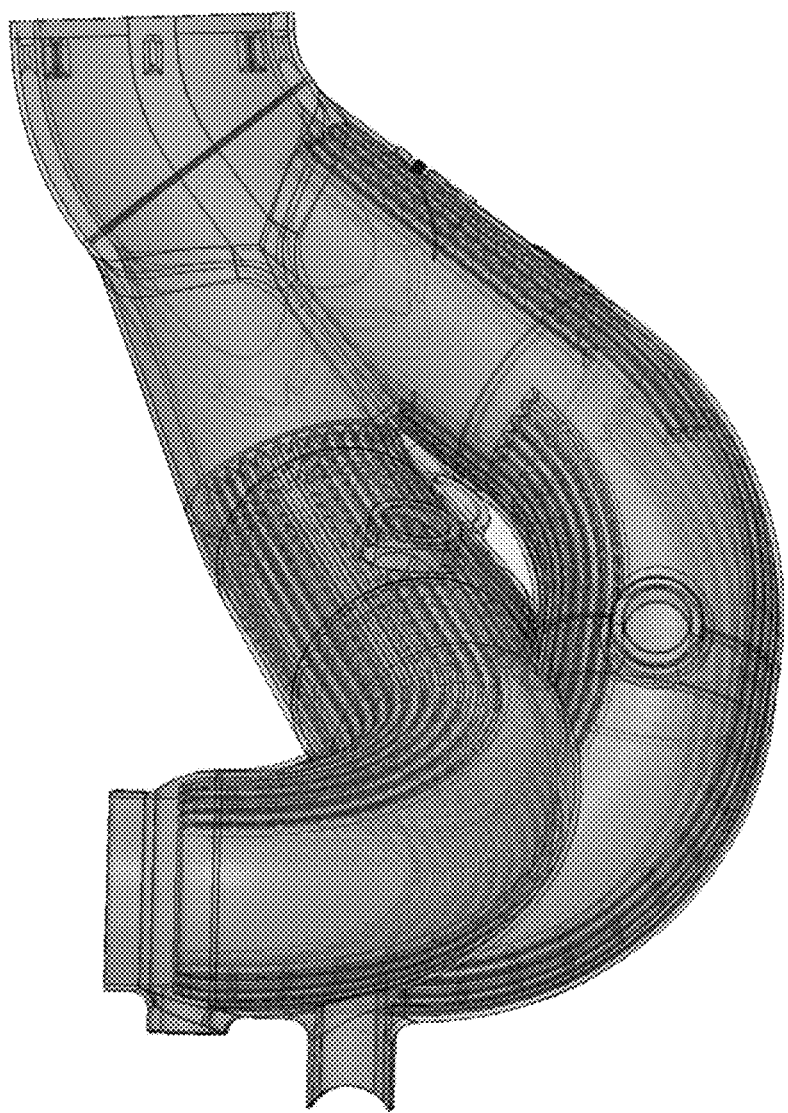
FIG. 14 is a transparent left side view of the exemplary water-cooled exhaust header of FIG. 2.

The narrow channels 32 provide longevity and reliability to the water jacket, help promote the distribution of water or other fluid within the water jacket, help avoid localized hot or cool spots, and serve as cooling fins. In the illustrated embodiment, the channels 32 generally distribute the cooling fluid from the inlets 16 to various portions of the water cavity 28, then to the open end of the water jacket at the collector outlet 22 (and/or to water outlet fittings if provided). Alternatively, the narrow channels 32 could help promote water flow to the exhaust path itself in a "wet" exhaust system. To accomplish such water distribution, the channels 32 are preferably designed, at least in some embodiments, to be generally "parallel" to the internal tubes 24. In this regard, FIGS. 11 and 12 are a transparent front view and a partially schematic front view, respectively, of the exemplary water-cooled exhaust header 10 of FIG. 2. Together, FIGS. 11 and 12 illustrate the general routes of the various narrow channels 32 described above. In FIG. 11, the narrow channels 32 themselves are visible, while in FIG. 12, areas of the various pipes 12 that include narrow channels 32 are marked and illustrated schematically. In some areas 40, the narrow channels 32 extend uninterrupted all the way from the entrance opening 20 of the respective pipe 12 to the pipe's junction with the collector 14. In other areas 42, the narrow channels 32 are interrupted in the area of a sensor boss 18 but otherwise extend from one end of the respective pipe 12 to the other. In still other areas 44, the narrow channels 32 extend only a portion of the length of the respective pipe 12. Further of the narrow channels 32 are shown in FIGS. 13 and 14, which are a transparent rear view and a transparent left side view, respectively, of the exemplary water-cooled exhaust header 10 of FIG. 2.

As with many conventional configurations, each internal tube 24 is of relatively uniform diameter along its length, and the thickness of the water jacket is likewise of relatively uniform diameter. At least in part because of this geometry, it may be advantageous for each narrow channel 32 to have a uniform cross-section to promote uniform water flow and resultant cooling. In at least some embodiments, the cross-sections of the various channels 32 are all generally the same. In at least some embodiments, the cross-section of each channel 32 includes straight sides and curved corner portions, while in at least some embodiments, each channel 32 is circular in cross-section.

As particularly highlighted in FIG. 9, perforations or cross-channels 38 are provided periodically between adjacent channels 32, thereby permitting water to flow or seep across adjacent channels 32. Perforations 38 are also provided periodically between the open left and right side spaces 34,36 and the narrow channels 32 closest thereto. FIGS. 11, 13, and 14 also provide further illustration of the perforations 38 between narrow channels 32 and between narrow channels 32 and the open left and right side spaces 34,36, and also of the spacing between the perforations 38 of each narrow channel 32. Conversely, different regions of the water cavity may be portioned from each other by using solid (non-perforated) walls 46. This is illustrated schematically, for example, in FIG. 12, wherein adjacent longitudinal channels along a boundary 52 separate the water jacket/water cavity on one of the middle pipes 12 into separate regions 54,56.

The narrow channels 32 are shown to extend along the pipes 12 as they join into the collector 14. However, as shown for example in FIGS. 8 and 10, the channels 32 terminate and empty into an open water cavity around the upper, merged portion of the collector 14, and as noted previously, a water outlet is provided around an upper collar of the collector 14. In this area of the collector 14, support between the inner and outer walls 24,26 of the collector 14 are provided by an arrangement of internal support structures 50 near the collar of the collector 14.

Although the illustrated approach to incorporating internal support structures into the water cavity 28 is believed to provide substantial advantages over various other internal support structure designs, it will be appreciated that other designs, such as lattices or other forms, may be additionally or alternatively utilized. A proper design helps increase heat transfer and allows the water pump to work less, thereby increasing engine horsepower and efficiency.

In addition to promoting the flow of water in the water jacket, the walls 46 of the narrow channels 32 make it possible to build a header or other water-cooled exhaust component using additive manufacturing or "3D printing" methods. This is illustrated, for example, in FIGS. 15-17, which are rear cutaway views similar in perspective to FIG. 8, but showing the state of the header 10 at arbitrarily-selected first, second, and third intermediate stages of an additive manufacturing process in accordance with one or more preferred embodiments of the present invention. In a typical additive manufacturing process, a 3D model is created using 3D modeling software. Based on the 3D model, data representing "slices" or layers of the object to be produced is generated and used by additive manufacturing equipment, which lays down or adds successive layers of liquid, powder, sheet material, or other material in a layer-by-layer manner to produce the object. The actual production begins by laying down the first layer of the object on a substrate 48. Additional layers are then added on top of the first, with the object effectively being created from the bottom up.

One additive manufacturing technology suitable for use in preferred embodiments of the present invention is direct metal laser sintering (DMLS), but other technologies may be suitable as well. DMLS may be used with a variety of materials, including 17-4 and 15-5 stainless steel, maraging steel, cobalt chromium, inconel 625 and 718, aluminum AlSi10Mg, and titanium Ti6Al4V.

Figure 15:
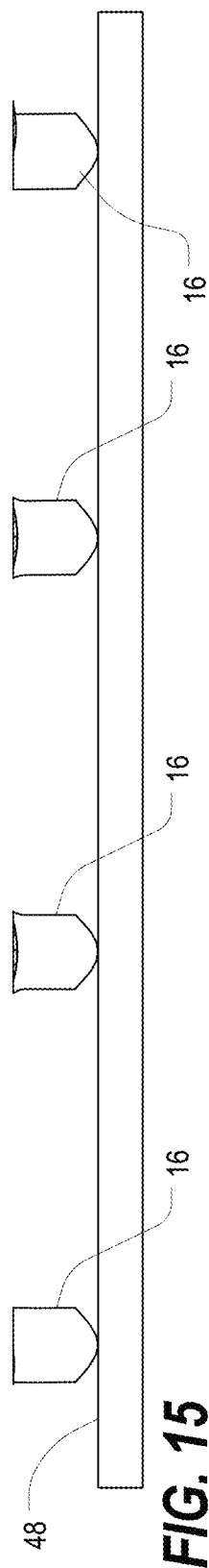
FIGS. 15-17 are rear cutaway views similar in perspective to FIG. 8, but showing the state of the header at arbitrarily-selected first, second, and third intermediate stages of an additive manufacturing process in accordance with one or more preferred embodiments of the present invention.
Figure 16:
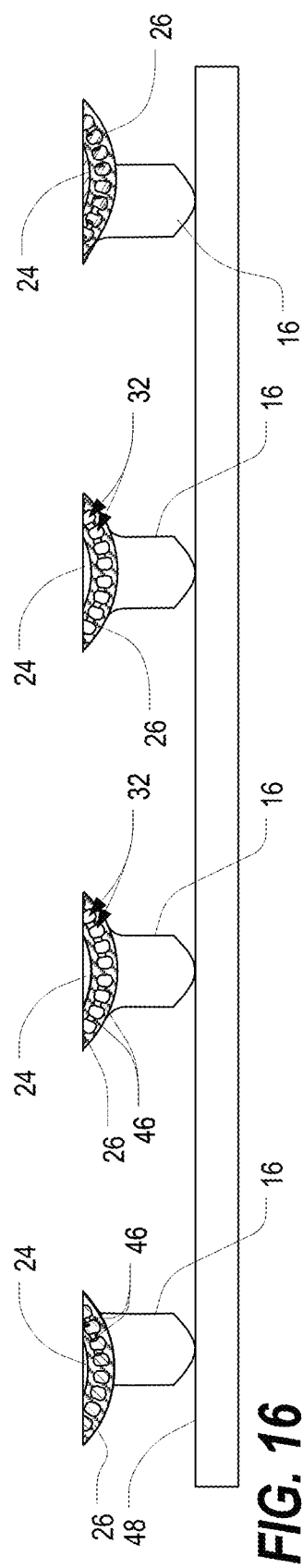
Figure 17:
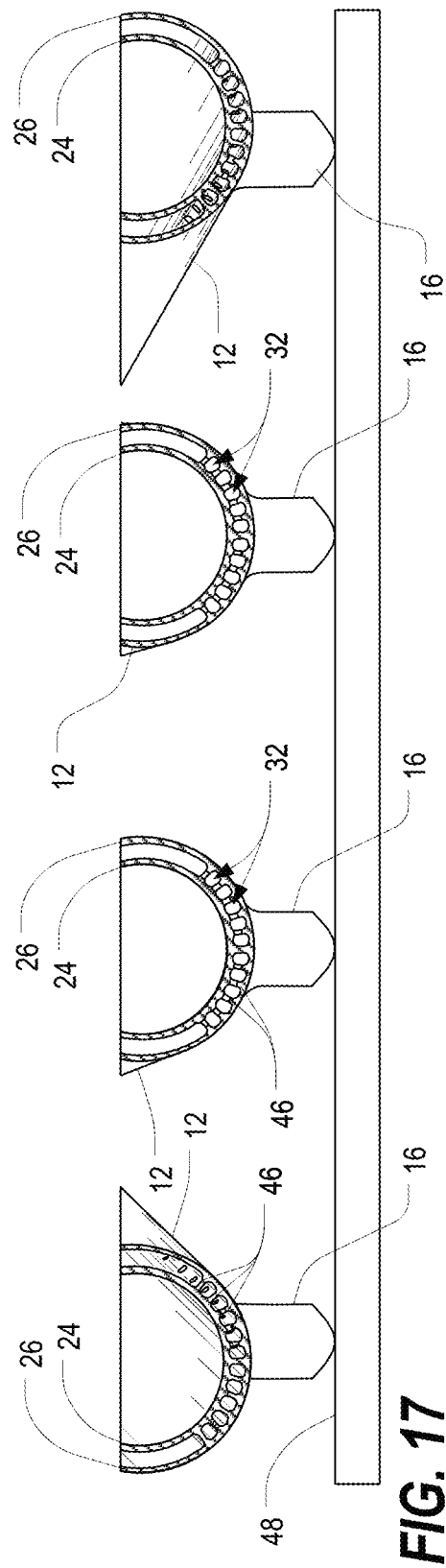

In the exemplary header 10 illustrated herein, the lowermost layer of the header 10 includes the bottoms of the water inlets 16, with the next layers also comprising portions of the water inlets 16. In FIG. 15, the bottommost portions of the pipes 12 have been reached, so subsequent layers must spread out to the sides. In FIG. 16, the bottommost portions of the outer walls 26 have been built, as well as most of the walls 46 between the narrow channels 32. The bottommost portions of the internal tubes 24 have then been built on top of the walls 46 between the narrow channels. In FIG. 17, the walls 46 of the narrow channels 32 at the bottom of each pipe 12 have been built. Notably, the side portions of both the internal tubes 24 and the outer walls 26 are built directly on top of lower portions thereof.

It will be appreciated that although the exemplary header 10 is shown as being built from the bottommost portions of the water inlets 16 up, the actual construction of a particular exhaust component may be carried out in any desired orientation, with the particular orientation that is selected being coordinated as part of the process of designing of the component such that the construction orientation may be dictated by, and/or specifically selected to achieve, a particular design. Thus, the construction sequence illustrated in FIGS. 15-17 should be understood to be exemplary of the general process of manufacturing water-cooled exhaust components and systems and not indicative of the particular sequence or orientation used for construction of the illustrated exemplary header.

Because the header 10 is constructed entirely via additive manufacturing, the various structures are integral with one another and the sorts of failures caused by fastening structures together in a weldment or fabrication are avoided, similar to the effect of casting a header. Unlike castings, however, the additive manufacturing approach makes it possible to produce internal tubes and outer walls of great precision, thereby providing vast performance improvements relative to the performance of castings. For example, it is possible to produce headers having internal tubes surrounded by outer walls wherein the internal tubes and the outer walls are both substantially cylindrical in form and wherein the tubes terminate in a merge collector.

Figure 18:
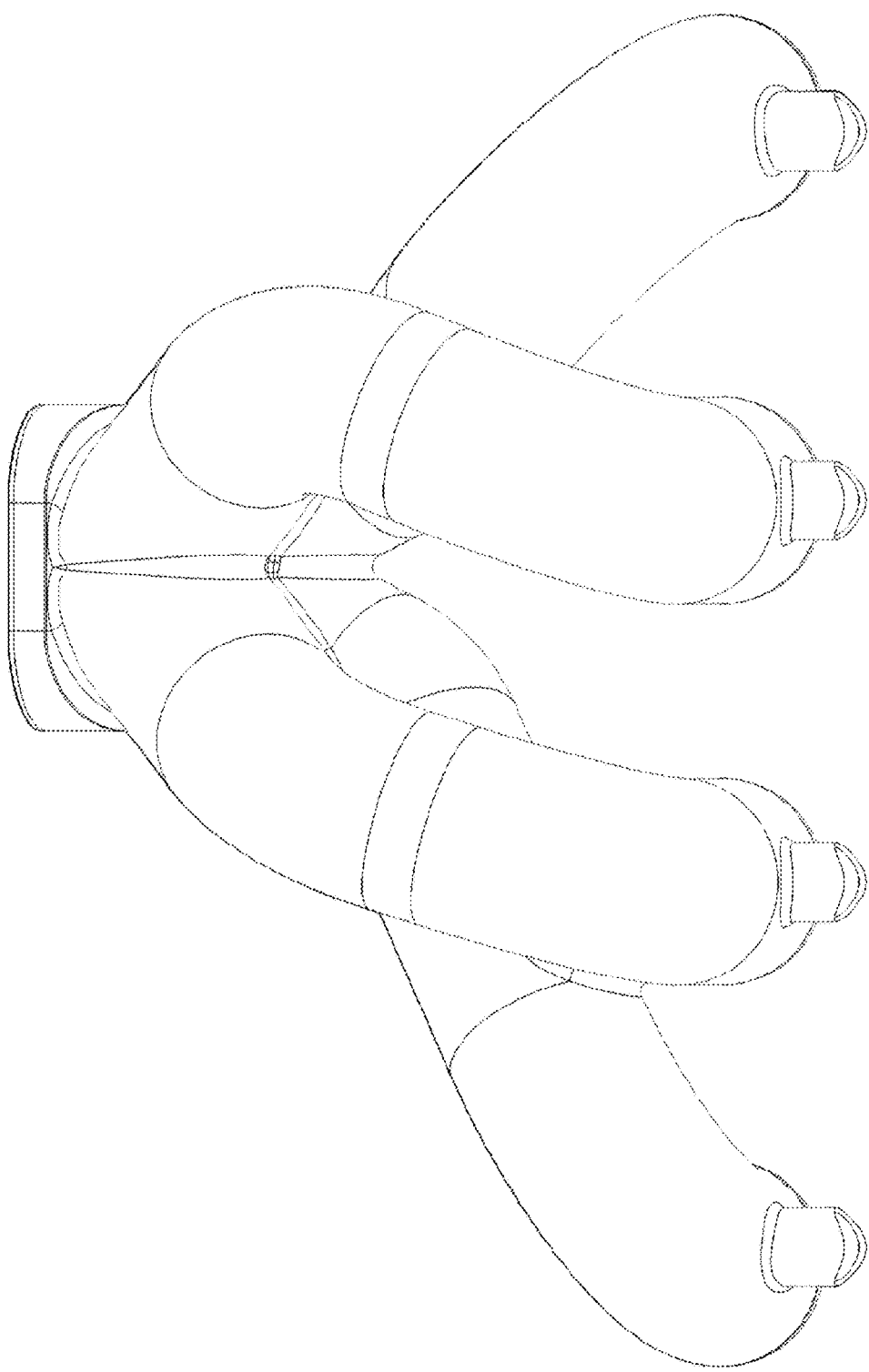
FIG. 18 is a front view of an exemplary bung-less water-cooled exhaust header in accordance with one or more preferred embodiments of the present invention.

The approaches described herein are particularly useful in the manufacture of durable bungs in high performance components. As noted previously, bungs are commonly provided as access points to the interior of the exhaust pipes for the collection of exhaust gas temperature, oxygen sensors, and the like. Although bungs may be cast, it is very difficult to produce durable bungs using the fabrication methods that are traditionally used for high performance water-cooled exhaust components because they require the use of welds. If a crack forms in one of these welds, or if such a weld breaks, engine damage is likely to occur due to water intrusion into the pipe and from there into the engine itself. Additive manufacturing and the internal support structures within the water jacket allow bungs 18 to be manufactured integral with both the internal tubes 24 and the outer walls 26 of the pipes, thereby vastly increasing reliability while providing, or even improving upon, the performance of a fabricated component. Because fewer welds are required, the overall design will exhibit lower stress than conventional high performance components. Of course, headers and other components that do not have bungs may likewise be produced with the attendant advantages of water and heat distribution, reliability, and manufacturability. In this regard, FIG. 18 is a front view of an exemplary bung-less water-cooled exhaust header 210 in accordance with one or more preferred embodiments of the present invention.

In various embodiments of the present invention, a variety of advantages are provided.

Advantageously, the risk of engine damage occurring from water entering the exhaust side of a header is significantly reduced. In at least some embodiments, welds, if used, are made in fewer locations, such as at the respective flanges 108,110. Furthermore, because there are fewer weld joints, overall durability is increased, the potential of failure is lowered, the overall stress is lowered due to less weld stress, and greater accuracy in the component is achieved due to less movement of the weld joints.

Advantageously, engine efficiency is increased due to the use of a true "merge" collector, wherein exhaust flow is merged uniformly within the collector. As a result, cylinder to cylinder communication is increased and equal flow between all cylinders is better accomplished as compared to prior art devices, which often have poor flow that resultingly increases back pressure lowering overall flow and energy.

Advantageously, durability is significantly increased through the use of internal supports in the water jacket around the collector. Such supports are extremely difficult to implement in the collectors of prior art headers, and their use makes it possible to increase reliability while still offering the improved functionality provided by the merge collector.

Advantageously, design parameters can be changed much more readily without regard to available tooling than in prior art approaches. Design parameters are almost limitless may include IE, tube diameter, tube centerline radius, cross-section, and the like in specific areas of the header to increase or even decrease flow.

Advantageously, additional additive material may be added to high stress regions specifically. With prior designs, making a part thicker in one area generally meant increasing the global thickness. As a result, the overall weight can be managed better, and in many cases can be kept approximately the same as with a corresponding part made with a prior art method but with increased durability in specific areas.

It will be appreciated that the exemplary header described and illustrated herein is intended for use in a header assembly that may include without limitation water supply pipes or tubes, inlet and outlet flanges, and other elements. In at least some embodiments, the header is manufactured as described herein, but other elements are produced using different manufacturing methods and/or materials.

It will also be appreciated that the teachings of the present invention are applicable not just to high performance headers, but to other water-cooled exhaust system components, including without limitation manifolds, risers, elbows, collectors, pipes, mufflers, and the like. Furthermore, although water-cooled exhaust components and systems are most commonly utilized in marine vessels, components of the present invention may be utilized in other high performance environments, such as automotive race vehicles, including cars, trucks, and other vehicles, in airplane and other aerospace environments, and in stationary power and power generation.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method of manufacturing a water-cooled exhaust component for an engine exhaust system, comprising:
    (a) designing a conduit for carrying hot exhaust gases in an engine exhaust system;
    (b) designing a water jacket for the conduit, the water jacket including an outer wall to surround the conduit and a water cavity between outer surfaces of the conduit and inner surfaces of the outer wall;
    (c) designing a pattern of internal structures between the conduit and the outer wall, the pattern of internal structures providing integral support between the conduit and the outer wall while permitting fluid flow through the water cavity;
    (d) providing a computer file representing an integrated design for the conduit, water jacket, and internal structures to an additive manufacturing system; and
    (e) thereafter, repetitively applying additive layers of material to produce a water-cooled exhaust component, wherein the water-cooled exhaust component includes the conduit, the water jacket, and the internal structures, and wherein the conduit, the water jacket, and the internal structures in the completed component are integral with one another.

2. The method of claim 1, wherein the pattern of internal structures includes a plurality of ribs or stringers defining a plurality of channels within the water jacket.

3. The method of claim 2, wherein designing the pattern of internal structures includes designing the ribs or stringers, and the channels defined thereby, to promote the distribution of the fluid in the water jacket.

4. The method of claim 2, wherein designing the pattern of internal structures includes designing the ribs or stringers, and the channels defined thereby, to minimize localized hot or cool spots in the water jacket.

5. The method of claim 2, wherein designing the pattern of internal structures includes designing the ribs or stringers such that the channels defined thereby include longitudinal channels that extend along the conduit.

6. The method of claim 5, wherein designing the pattern of internal structures includes designing the ribs or stringers such that the longitudinal channels defined thereby extend substantially along the entire length of the conduit.

7. The method of claim 5, wherein designing the pattern of internal structures includes designing the ribs or stringers such that the channels defined thereby further include perforations or cross-channels between the longitudinal channels.

8. The method of claim 2, wherein designing the pattern of internal structures includes designing the ribs or stringers such that the channels defined thereby are parallel to one another.

9. The method of claim 8, wherein designing the pattern of internal structures includes designing the ribs or stringers such that the channels defined thereby are parallel to the conduit.

10. The method of claim 1, wherein the conduit is a pipe forming part of an exhaust header.

11. The method of claim 10, wherein:
    (f) the pipe is a first pipe with a first water jacket;
    (g) the method further comprises designing a second pipe, having a second water jacket and a second pattern of internal structures, for carrying hot exhaust gases in the engine exhaust system;
    (h) the method further comprises designing a collector, having a third water jacket, for receiving the hot exhaust gases from the first and second pipes, such that the third water jacket is in fluid communication with the first and second water jackets; and
    (i) the step of repetitively applying additive layers of material includes repetitively applying additive layers of material to produce the header, including the first and second pipes, the collector, the first, second, and third water jackets, and the internal structures.

12. The method of claim 11, wherein the step of designing a collector includes designing a true merge collector wherein a smooth flow of exhaust gases is provided from a distal end of each respective pipe at a substantially uniform pipe diameter and pipe angle for each pipe.

13. A method of cooling an exhaust component in an engine exhaust system, comprising:
    (a) manufacturing, via an additive manufacturing process, an exhaust component having a conduit for carrying hot exhaust gases in an engine exhaust system, an outer wall surrounding the conduit, a water cavity between outer surfaces of the conduit and inner surfaces of the outer wall, a fluid inlet, a fluid outlet, and a pattern of internal structures between the conduit and the outer wall, wherein the pattern of internal structures provides integral support between the conduit and the outer wall while permitting fluid flow through the water cavity;

(b) installing the exhaust component in operative relationship in an engine exhaust system;

(c) supplying fluid to the fluid inlet of the exhaust component such that it flows into the water cavity; and (d) during operation of the engine exhaust system, conducting the fluid from the fluid inlet through the pattern of internal structures in the water cavity to the fluid outlet such that as the fluid flows through the water cavity, the fluid absorbs heat from hot exhaust gases flowing through the conduit.

14. The method of claim 13, wherein the pattern of internal structures includes a plurality of ribs or stringers defining a plurality of channels within the water cavity.

15. The method of claim 14, wherein the channels defined by the ribs or stringers include longitudinal channels that extend along the conduit.

16. The method of claim 15, wherein the longitudinal channels defined by the ribs or stringers extend substantially along the entire length of the conduit.

17. The method of claim 15, wherein the channels defined by the ribs or stringers further include perforations or cross-channels between the longitudinal channels.

18. The method of claim 14, wherein the channels defined by the ribs or stringers are parallel to one another.

19. The method of claim 18, wherein the channels defined by the ribs or stringers are parallel to the conduit.

20. The method of claim 13, wherein the conduit is a pipe forming part of an exhaust header.

* * * * *